(12) United States Patent
Guéziec

(10) Patent No.: US 8,718,910 B2
(45) Date of Patent: May 6, 2014

(54) CROWD SOURCED TRAFFIC REPORTING

(75) Inventor: André Guéziec, Sunnyvale, CA (US)

(73) Assignee: Pelmorex Canada Inc., Oakville, Ontario (CA)

(*) Notice: Subject to any disclaimer, the term of this patent is extended or adjusted under 35 U.S.C. 154(b) by 44 days.

(21) Appl. No.: 13/296,108

(22) Filed: Nov. 14, 2011

(65) Prior Publication Data

US 2012/0123667 A1 May 17, 2012

Related U.S. Application Data

(60) Provisional application No. 61/413,473, filed on Nov. 14, 2010, provisional application No. 61/487,425, filed on May 18, 2011.

(51) Int. Cl.
*G06F 19/00* (2011.01)
*G06G 7/76* (2006.01)
*G08G 1/00* (2006.01)

(52) U.S. Cl.
USPC .......................................................... 701/119

(58) Field of Classification Search
USPC .......................................... 701/119; 715/201
See application file for complete search history.

(56) References Cited

U.S. PATENT DOCUMENTS

| | | | |
|---|---|---|---|
| 4,734,863 A | 3/1988 | Honey et al. | |
| 4,788,645 A | 11/1988 | Zavoli et al. | |
| 4,792,803 A | 12/1988 | Madnick et al. | |
| 4,796,191 A | 1/1989 | Honey et al. | |
| 4,878,170 A | 10/1989 | Zeevi | |
| 4,914,605 A | 4/1990 | Loughmiller, Jr. et al. | |
| 4,926,343 A | 5/1990 | Tsuruta et al. | |
| 5,068,656 A | 11/1991 | Sutherland | |
| 5,095,532 A | 3/1992 | Mardus | |
| 5,126,941 A | 6/1992 | Gurmu et al. | |
| 5,164,904 A | 11/1992 | Sumner | |
| 5,173,691 A | 12/1992 | Sumner | |
| 5,182,555 A | 1/1993 | Sumner | |

(Continued)

FOREIGN PATENT DOCUMENTS

| | | |
|---|---|---|
| DE | 19856704 | 6/2001 |
| EP | 0 749 103 | 12/1996 |

(Continued)

OTHER PUBLICATIONS

Blumentritt, K. et al., "TravTek System Architecture Evaluation," Publication No. FHWA-RD-96-141, Jul. 1995, 504 pages, U.S. Department of Transportation, McLean, VA, USA.

(Continued)

*Primary Examiner* — Mary Cheung
*Assistant Examiner* — Frederick Brushaber
(74) *Attorney, Agent, or Firm* — Lewis Roca Rothgerber LLP

(57) ABSTRACT

A traffic reporting service may allow for the generation of more reliable and accurate traffic reports, maps, and forecasts based on various data types and sources. Data sources include public sector sources, private entities, and end users providing crowd sourced data. Crowd sourced data is collected, verified, and used to generate a traffic report which is displayed to a user via a computing device. A user may use various information presented in the traffic report to make informed decisions when choosing travel routes and a departure time to reach a desired destination.

14 Claims, 3 Drawing Sheets

(56) References Cited

U.S. PATENT DOCUMENTS

| | | |
|---|---|---|
| 5,220,507 A | 6/1993 | Kirson |
| 5,247,439 A | 9/1993 | Gurmu et al. |
| 5,262,775 A | 11/1993 | Tamai et al. |
| 5,276,785 A | 1/1994 | Mackinlay et al. |
| 5,283,575 A | 2/1994 | Kao et al. |
| 5,291,412 A | 3/1994 | Tamai et al. |
| 5,291,413 A | 3/1994 | Tamai et al. |
| 5,291,414 A | 3/1994 | Tamai et al. |
| 5,297,028 A | 3/1994 | Ishikawa |
| 5,297,049 A | 3/1994 | Gurmu et al. |
| 5,303,159 A | 4/1994 | Tamai et al. |
| 5,311,195 A | 5/1994 | Mathis et al. |
| 5,311,434 A | 5/1994 | Tamai |
| 5,339,246 A | 8/1994 | Kao |
| 5,343,400 A | 8/1994 | Ishikawa |
| 5,345,382 A | 9/1994 | Kao |
| 5,359,529 A | 10/1994 | Snider |
| 5,374,933 A | 12/1994 | Kao |
| 5,377,113 A | 12/1994 | Shibazaki et al. |
| 5,390,123 A | 2/1995 | Ishikawa |
| 5,394,333 A | 2/1995 | Kao |
| 5,402,120 A | 3/1995 | Fujii et al. |
| 5,414,630 A | 5/1995 | Oshizawa et al. |
| 5,428,545 A | 6/1995 | Maegawa et al. |
| 5,430,655 A | 7/1995 | Adachi |
| 5,440,484 A | 8/1995 | Kao |
| 5,465,079 A | 11/1995 | Bouchard et al. |
| 5,477,220 A | 12/1995 | Ishikawa |
| 5,485,161 A | 1/1996 | Vaughn |
| 5,488,559 A | 1/1996 | Seymour |
| 5,499,182 A | 3/1996 | Ousborne |
| 5,508,931 A | 4/1996 | Snider |
| 5,515,283 A | 5/1996 | Desai |
| 5,515,284 A | 5/1996 | Abe |
| 5,539,645 A | 7/1996 | Mandhyan et al. |
| 5,546,107 A | 8/1996 | Deretsky et al. |
| 5,548,822 A | 8/1996 | Yogo |
| 5,550,538 A | 8/1996 | Fujii et al. |
| 5,554,845 A | 9/1996 | Russell |
| 5,583,972 A | 12/1996 | Miller |
| 5,608,635 A | 3/1997 | Tamai |
| 5,610,821 A | 3/1997 | Gazis et al. |
| 5,689,252 A | 11/1997 | Ayanoglu et al. |
| 5,694,534 A | 12/1997 | White, Jr. et al. |
| 5,699,056 A | 12/1997 | Yoshida |
| 5,706,503 A | 1/1998 | Poppen et al. |
| 5,712,788 A | 1/1998 | Liaw et al. |
| 5,729,458 A | 3/1998 | Poppen |
| 5,731,978 A | 3/1998 | Tamai et al. |
| 5,742,922 A | 4/1998 | Kim |
| 5,751,245 A | 5/1998 | Janky et al. |
| 5,751,246 A | 5/1998 | Hertel |
| 5,757,359 A | 5/1998 | Morimoto et al. |
| 5,774,827 A | 6/1998 | Smith et al. |
| 5,818,356 A | 10/1998 | Schuessler |
| 5,822,712 A | 10/1998 | Olsson |
| 5,845,227 A | 12/1998 | Peterson |
| 5,850,190 A | 12/1998 | Wicks et al. |
| 5,862,244 A | 1/1999 | Kleiner et al. |
| 5,862,509 A | 1/1999 | Desai et al. |
| 5,864,305 A | 1/1999 | Rosenquist |
| 5,867,110 A | 2/1999 | Naito et al. |
| 5,893,081 A | 4/1999 | Poppen |
| 5,893,898 A | 4/1999 | Tanimoto |
| 5,898,390 A | 4/1999 | Oshizawa et al. |
| 5,902,350 A | 5/1999 | Tamai et al. |
| 5,904,728 A | 5/1999 | Tamai et al. |
| 5,908,464 A | 6/1999 | Kishigami et al. |
| 5,910,177 A | 6/1999 | Zuber |
| 5,911,773 A | 6/1999 | Mutsuga et al. |
| 5,912,635 A | 6/1999 | Oshizawa et al. |
| 5,916,299 A | 6/1999 | Poppen |
| 5,922,042 A | 7/1999 | Sekine et al. |
| 5,928,307 A | 7/1999 | Oshizawa et al. |
| 5,931,888 A | 8/1999 | Hiyokawa |
| 5,933,100 A | 8/1999 | Golding |
| 5,938,720 A | 8/1999 | Tamai |
| 5,948,043 A | 9/1999 | Mathis et al. |
| 5,978,730 A | 11/1999 | Poppen et al. |
| 5,982,298 A | 11/1999 | Lappenbusch et al. |
| 5,987,381 A | 11/1999 | Oshizawa et al. |
| 5,991,687 A | 11/1999 | Hale et al. |
| 5,999,882 A | 12/1999 | Simpson et al. |
| 6,009,374 A | 12/1999 | Urahashi |
| 6,011,494 A | 1/2000 | Watanabe et al. |
| 6,016,485 A | 1/2000 | Amakawa et al. |
| 6,021,406 A | 2/2000 | Kuznetsov |
| 6,038,509 A | 3/2000 | Poppen et al. |
| 6,058,390 A | 5/2000 | Liaw et al. |
| 6,064,970 A | 5/2000 | McMillan et al. |
| 6,091,359 A | 7/2000 | Geier |
| 6,091,956 A | 7/2000 | Hollenberg |
| 6,097,399 A | 8/2000 | Bhatt et al. |
| 6,111,521 A | 8/2000 | Mulder et al. |
| 6,144,919 A | 11/2000 | Ceylan et al. |
| 6,147,626 A | 11/2000 | Sakakibara |
| 6,150,961 A | 11/2000 | Alewine et al. |
| 6,161,092 A | 12/2000 | Latshaw et al. |
| 6,169,552 B1 | 1/2001 | Endo et al. |
| 6,188,956 B1 | 2/2001 | Walters |
| 6,209,026 B1 | 3/2001 | Ran et al. |
| 6,222,485 B1 | 4/2001 | Walters et al. |
| 6,236,933 B1 | 5/2001 | Lang |
| 6,253,146 B1 | 6/2001 | Hanson et al. |
| 6,253,154 B1 | 6/2001 | Oshizawa et al. |
| 6,256,577 B1 | 7/2001 | Graunke |
| 6,259,987 B1 | 7/2001 | Ceylan et al. |
| 6,282,486 B1 | 8/2001 | Bates et al. |
| 6,282,496 B1 | 8/2001 | Chowdhary |
| 6,292,745 B1 | 9/2001 | Robare et al. |
| 6,295,492 B1 | 9/2001 | Lang et al. |
| 6,297,748 B1 | 10/2001 | Lappenbusch et al. |
| 6,298,305 B1 | 10/2001 | Kadaba et al. |
| 6,317,685 B1 | 11/2001 | Kozak et al. |
| 6,317,686 B1 | 11/2001 | Ran |
| 6,335,765 B1 | 1/2002 | Daly et al. |
| 6,353,795 B1 | 3/2002 | Ranjan |
| 6,356,836 B1 | 3/2002 | Adolph |
| 6,360,165 B1 | 3/2002 | Chowdhary |
| 6,362,778 B2 | 3/2002 | Neher |
| 6,415,291 B2 | 7/2002 | Bouve et al. |
| 6,424,910 B1 | 7/2002 | Ohler et al. |
| 6,456,931 B1 | 9/2002 | Polidi et al. |
| 6,456,935 B1 | 9/2002 | Ng |
| 6,463,400 B1 | 10/2002 | Barkley-Yeung |
| 6,466,862 B1 | 10/2002 | DeKock et al. |
| 6,470,268 B1 | 10/2002 | Ashcraft et al. |
| 6,473,000 B1 | 10/2002 | Secreet et al. |
| 6,480,783 B1 | 11/2002 | Myr |
| 6,504,541 B1 | 1/2003 | Liu et al. |
| 6,529,143 B2 | 3/2003 | Mikkola et al. |
| 6,532,304 B1 | 3/2003 | Liu et al. |
| 6,539,302 B1 | 3/2003 | Bender et al. |
| 6,542,814 B2 | 4/2003 | Polidi et al. |
| 6,552,656 B2 | 4/2003 | Polidi et al. |
| 6,556,905 B1 | 4/2003 | Mittelsteadt et al. |
| 6,559,865 B1 | 5/2003 | Angwin |
| 6,574,548 B2 | 6/2003 | DeKock et al. |
| 6,584,400 B2 | 6/2003 | Beardsworth |
| 6,594,576 B2 | 7/2003 | Fan et al. |
| 6,598,016 B1 | 7/2003 | Zavoli et al. |
| 6,600,994 B1 | 7/2003 | Polidi |
| 6,603,405 B2 | 8/2003 | Smith |
| 6,622,086 B2 | 9/2003 | Polidi |
| 6,643,581 B2 | 11/2003 | Ooishi |
| 6,650,997 B2 | 11/2003 | Funk |
| 6,675,085 B2 | 1/2004 | Straub |
| 6,681,176 B2 | 1/2004 | Funk et al. |
| 6,687,615 B1 | 2/2004 | Krull et al. |
| 6,700,503 B2 | 3/2004 | Masar et al. |
| 6,710,774 B1 | 3/2004 | Kawasaki et al. |
| 6,720,889 B2 | 4/2004 | Yamaki et al. |
| 6,728,605 B2 | 4/2004 | Lash et al. |
| 6,728,628 B2 | 4/2004 | Peterson |

(56) References Cited

U.S. PATENT DOCUMENTS

| | | |
|---|---|---|
| 6,731,940 B1 | 5/2004 | Nagendran |
| 6,735,516 B1 | 5/2004 | Manson |
| 6,754,833 B1 | 6/2004 | Black et al. |
| 6,785,606 B2 | 8/2004 | DeKock et al. |
| 6,791,472 B1 | 9/2004 | Hoffberg |
| 6,807,483 B1 | 10/2004 | Chao et al. |
| 6,845,316 B2 | 1/2005 | Yates |
| 6,862,524 B1 | 3/2005 | Nagda et al. |
| RE38,724 E | 4/2005 | Peterson |
| 6,885,937 B1 | 4/2005 | Suranyi |
| 6,901,330 B1 | 5/2005 | Krull et al. |
| 6,914,541 B1 | 7/2005 | Zierden |
| 6,922,629 B2 | 7/2005 | Yoshikawa et al. |
| 6,931,309 B2 | 8/2005 | Phelan et al. |
| 6,952,643 B2 | 10/2005 | Matsuoka et al. |
| 6,965,665 B2 | 11/2005 | Fan et al. |
| 6,983,204 B2 | 1/2006 | Knutson |
| 6,987,964 B2 | 1/2006 | Obradovich et al. |
| 6,989,765 B2 | 1/2006 | Gueziec |
| 6,999,873 B1 | 2/2006 | Krull et al. |
| 7,010,583 B1 | 3/2006 | Aizono et al. |
| 7,062,378 B2 | 6/2006 | Krull et al. |
| 7,069,143 B2 | 6/2006 | Peterson |
| 7,103,854 B2 | 9/2006 | Fuchs et al. |
| 7,161,497 B2 * | 1/2007 | Gueziec ............... 340/905 |
| 7,221,287 B2 * | 5/2007 | Gueziec et al. ............. 340/905 |
| 7,343,242 B2 | 3/2008 | Breitenberger et al. |
| 7,356,392 B2 | 4/2008 | Hubbard et al. |
| 7,375,649 B2 | 5/2008 | Gueziec |
| 7,433,676 B2 | 10/2008 | Kobayashi et al. |
| 7,440,842 B1 | 10/2008 | Vorona |
| 7,486,201 B2 * | 2/2009 | Kelly et al. ............. 340/905 |
| 7,508,321 B2 | 3/2009 | Gueziec |
| 7,557,730 B2 * | 7/2009 | Gueziec ............... 340/905 |
| 7,558,674 B1 | 7/2009 | Neiley et al. |
| 7,603,138 B2 | 10/2009 | Zhang et al. |
| 7,610,145 B2 | 10/2009 | Kantarjiev et al. |
| 7,613,564 B2 | 11/2009 | Vorona |
| 7,634,352 B2 | 12/2009 | Soulchin et al. |
| 7,702,452 B2 | 4/2010 | Kantarjiev et al. |
| 7,792,642 B1 | 9/2010 | Neilley et al. |
| 7,880,642 B2 | 2/2011 | Gueziec |
| 7,908,076 B2 | 3/2011 | Downs et al. |
| 7,912,627 B2 | 3/2011 | Downs et al. |
| 8,103,443 B2 | 1/2012 | Kantarjiev et al. |
| 8,358,222 B2 | 1/2013 | Gueziec |
| 8,531,312 B2 | 9/2013 | Gueziec |
| 8,537,033 B2 | 9/2013 | Gueziec |
| 8,564,455 B2 | 10/2013 | Gueziec |
| 2001/0014848 A1 | 8/2001 | Walgers et al. |
| 2001/0018628 A1 | 8/2001 | Jenkins et al. |
| 2001/0026276 A1 | 10/2001 | Sakamoto et al. |
| 2001/0033225 A1 | 10/2001 | Razavi et al. |
| 2001/0047242 A1 | 11/2001 | Ohta |
| 2002/0042819 A1 | 4/2002 | Reichert et al. |
| 2002/0077748 A1 | 6/2002 | Nakano |
| 2002/0152020 A1 | 10/2002 | Seibel |
| 2002/0177947 A1 | 11/2002 | Cayford |
| 2003/0046158 A1 | 3/2003 | Kratky |
| 2003/0109985 A1 | 6/2003 | Kotzin |
| 2003/0135304 A1 | 7/2003 | Sroub et al. |
| 2003/0182052 A1 | 9/2003 | DeLorme et al. |
| 2004/0034464 A1 | 2/2004 | Yoshikawa et al. |
| 2004/0046759 A1 | 3/2004 | Soulchin et al. |
| 2004/0049424 A1 | 3/2004 | Murray et al. |
| 2004/0080624 A1 | 4/2004 | Yuen |
| 2004/0107288 A1 | 6/2004 | Menninger et al. |
| 2004/0143385 A1 | 7/2004 | Smyth et al. |
| 2004/0225437 A1 | 11/2004 | Endo et al. |
| 2004/0249568 A1 | 12/2004 | Endo et al. |
| 2005/0021225 A1 | 1/2005 | Kantarjiev et al. |
| 2005/0027436 A1 | 2/2005 | Yoshikawa et al. |
| 2005/0143902 A1 | 6/2005 | Soulchin et al. |
| 2005/0154505 A1 | 7/2005 | Nakamura et al. |
| 2006/0122846 A1 | 6/2006 | Burr et al. |
| 2006/0143959 A1 | 7/2006 | Stehle et al. |
| 2006/0145892 A1 | 7/2006 | Gueziec |
| 2006/0158330 A1 | 7/2006 | Gueziec |
| 2006/0238521 A1 | 10/2006 | Westerman et al. |
| 2006/0284766 A1 | 12/2006 | Gruchala et al. |
| 2007/0013551 A1 * | 1/2007 | Gueziec ............... 340/905 |
| 2007/0060384 A1 | 3/2007 | Dohta |
| 2007/0066394 A1 | 3/2007 | Ikeda et al. |
| 2007/0197217 A1 * | 8/2007 | Sutardja ............... 455/433 |
| 2007/0208495 A1 | 9/2007 | Chapman et al. |
| 2007/0208496 A1 | 9/2007 | Downs et al. |
| 2007/0211026 A1 | 9/2007 | Ohta |
| 2007/0211027 A1 | 9/2007 | Ohta |
| 2007/0222750 A1 | 9/2007 | Ohta |
| 2007/0247291 A1 | 10/2007 | Masuda et al. |
| 2007/0265766 A1 * | 11/2007 | Jung et al. ............... 701/117 |
| 2008/0071465 A1 * | 3/2008 | Chapman et al. ............. 701/117 |
| 2008/0084385 A1 | 4/2008 | Ranta et al. |
| 2008/0133120 A1 | 6/2008 | Romanick |
| 2008/0255754 A1 | 10/2008 | Pinto |
| 2008/0297488 A1 | 12/2008 | Operowsky et al. |
| 2009/0005965 A1 | 1/2009 | Forstall et al. |
| 2009/0061971 A1 | 3/2009 | Weitzner et al. |
| 2009/0066495 A1 | 3/2009 | Newhouse et al. |
| 2009/0082950 A1 | 3/2009 | Vorona |
| 2009/0112465 A1 | 4/2009 | Weiss et al. |
| 2009/0118017 A1 | 5/2009 | Perlman et al. |
| 2009/0118996 A1 | 5/2009 | Kantarjiev et al. |
| 2009/0189979 A1 | 7/2009 | Smyth |
| 2009/0192702 A1 | 7/2009 | Bourne |
| 2010/0094531 A1 | 4/2010 | MacLeod |
| 2010/0100307 A1 * | 4/2010 | Kim ............... 701/119 |
| 2010/0145569 A1 | 6/2010 | Bourque et al. |
| 2010/0145608 A1 | 6/2010 | Kurtti et al. |
| 2010/0175006 A1 | 7/2010 | Li |
| 2010/0198453 A1 | 8/2010 | Dorogusker et al. |
| 2010/0225643 A1 | 9/2010 | Gueziec |
| 2010/0305839 A1 | 12/2010 | Wenzel |
| 2010/0312462 A1 | 12/2010 | Gueziec |
| 2010/0333045 A1 | 12/2010 | Gueziec |
| 2011/0037619 A1 | 2/2011 | Ginsberg et al. |
| 2011/0106427 A1 | 5/2011 | Kim et al. |
| 2011/0304447 A1 | 12/2011 | Marumoto |
| 2012/0150422 A1 | 6/2012 | Kantarjiev et al. |
| 2012/0150425 A1 | 6/2012 | Chapman et al. |
| 2012/0158275 A1 | 6/2012 | Huang et al. |
| 2012/0290202 A1 | 11/2012 | Gueziec |
| 2012/0290204 A1 | 11/2012 | Gueziec |
| 2012/0296559 A1 | 11/2012 | Gueziec |
| 2013/0033385 A1 | 2/2013 | Gueziec |
| 2013/0204514 A1 | 8/2013 | Margulici |
| 2013/0207817 A1 | 8/2013 | Gueziec |
| 2013/0211701 A1 | 8/2013 | Baker et al. |

FOREIGN PATENT DOCUMENTS

| | | |
|---|---|---|
| EP | 0 987 665 | 3/2000 |
| EP | 1 006 367 | 6/2000 |
| GB | 2 400 293 | 10/2004 |
| JP | 05-313578 | 11/1993 |
| JP | 08-77485 | 3/1996 |
| JP | 10-261188 | 9/1998 |
| JP | 10-281782 | 10/1998 |
| JP | 10-293533 | 11/1998 |
| JP | 2000-055675 | 2/2000 |
| JP | 2000-113387 | 4/2000 |
| JP | 2001-330451 | 11/2001 |
| WO | WO 98/23018 | 5/1998 |
| WO | WO 00/50917 | 8/2000 |
| WO | WO 01/88480 | 11/2001 |
| WO | WO 02/077921 | 10/2002 |
| WO | WO 03/014671 | 2/2003 |
| WO | WO 2005/013063 | 2/2005 |
| WO | WO 2005/076031 | 8/2005 |
| WO | WO 2010/073053 | 7/2010 |
| WO | WO 2012/024694 | 2/2012 |
| WO | WO 2012/037287 | 3/2012 |

(56) References Cited

FOREIGN PATENT DOCUMENTS

| WO | WO 2012/065188 | 5/2012 |
|---|---|---|
| WO | WO 2012/159803 | 11/2012 |
| WO | WO 2013/113029 | 8/2013 |

OTHER PUBLICATIONS

Brooks, et al., "Turn-by-Turn Displays versus Electronic Maps: An On-the-Road Comparison of Driver Glance Behavior," Technical Report, The University of Michigan, Transportation Research Institute (UMTRI), Jan. 1999.
Burgett, A.L., "Safety Evaluation of TravTek," Vehicle Navigation & Information Systems Conference Proceedings (VNIS'91), P-253, Part 1, Oct. 1991, pp. 819-825, Soc. of Automotive Engineers, Inc., Warrendale, PA, USA.
Campbell, J.L. "Development of Human Factors Design Guidelines for Advanced Traveler Information Systems (ATIS)", Proceedings Vehicle Navigation and Information Systems Conference, 1995, pp. 161-164, IEEE, New York, NY, USA.
Campbell, J.L. "Development of Human Factors Design Guidelines for Advanced Traveler Information Systems (ATIS) and Commercial Vehicle Operations (CVO)", Publication No. FHWA-RD-98-057, Report Date Sep. 1998, 294, pages, U.S. Department of Transportation, McLean, VA 22010-2296.
Carin Navigation System Manual and Service Manual for Model Carin 22SY520, 76 pages, Philips Car Systems, The Netherlands.
Cathey, F.W. et al., "A Prescription for Transit Arrival/Department Prediction Using Automatic Vehicle Location Data," Transportation Research Part C 11, 2003, pp. 241-264, Pergamon Press Ltd., Elsevier Ltd., U.K.
Chien, S.I. et al., "Predicting Travel Times for the South Jersey Real-Time Motorist Information System," Transportation Research Record 1855, Paper No. Mar. 2750, Revised Oct. 2001, pp. 32-40.
Chira-Chavala, T. et al., "Feasibility Study of Advanced Technology HOV Systems," vol. 3: Benefit Implications of Alternative Policies for Including HOV lanes in Route Guidance Networks, Dec. 1992, 84 ages, UCB-ITS-PRR-92-5 PATH Research Report, Inst. of Transportation Studies, Univ. of Calif., Berkeley, USA.
Clark, E.L., Development of Human Factors Guidelines for Advanced Traveler Information Systems (ATIS) and Commercial Vehicle Operations (CVO): Comparable Systems Analysis, Dec. 1996, 199 pages.
Dancer, F. et al., "Vehicle Navigation Systems: Is America Ready?," Navigation and Intelligent Transportation System, Automotive Electronics Series, Society of Automotive Engineers, 1998, pp. Cover page, Table of Contents pp. 3-8.
Davies, P. et al., "Assessment of Advanced Technologies for Relieving Urban Traffic Congestion" National Cooperative Highway Research Program Report 340, Dec. 1991, 106 pages.
de Cambray, B. "Three-Dimensional (3D) Modeling in a Geographical Database," Auto-Carto'11, Eleventh International Conference on Computer Assisted Cartography, Oct. 30, 1993-Nov. 1, 1993, pp. 338-347, Minneapolis, USA.
Declaration Under 37 C.F.R. 1.131 and Source Code from U.S. Appl. No. 10/897,550.
Dillenburg, J.F. et al., "The Intelligent Travel Assistant," IEEE 5th International Conference on Intelligent Transportation Systems, Sep. 3-6, 2002, pp. 691-696, Singapore.
Dingus, T.A. et al., "Human Factors Engineering the TravTek Driver Interface," Vehicle Navigation & Information System Conference Proceedings (VNIS'91), P-253, Part 2, Oct. 1991, pp. 749-755, Soc. of Automotive Engineers, Inc., Warrendale, PA, USA.
Endo, et al., "Development and Evaluation of a Car Navigation System Providing a Birds Eye View Map Display," Navigation and Intelligent Transportation Systems, Automotive Electronics Series, Society of Automative Engineers, 1998, pp. Cover page, Table of Contens, pp. 19-22.
Eppinger, A. et al., "Dynamic Route Guidance—Status and Trends," Convergence 2000 International Congress on Transportation Electronics, Oct. 16-18, 1999, 7 pages, held in Detroit, MI, SAE International Paper Series, Warrendale, PA, USA.
Expert Report of Dr. Michael Goodchild Concerning the Validity of U.S. 5,938,720 dated Jun. 16, 2011 in *Triangle Software, LLC* v. *Garmin International Inc. et al.*, in the United States District Court for the Eastern District of Virginia, Alexandria Division, Case No. 1:10-cv-1457-CMH-TCB, 16 pages.
Fawcett, J., "Adaptive Routing for Road Traffic," IEEE Computer Graphics and Applications, May/Jun. 2000, pp. 46-53, IEEE, New York, NY, USA.
Fleischman, R.N., "Research and Evaluation Plans for the TravTek IVHS Operational Field Test," Vehicle Navigation & Information Systems Conference Proceedings (VNIS'91), P-253, Part 2, Oct. 1991, pp. 827-837, Soc. of Automotive Engineers, Inc., Warrendale, PA, USA.
Garmin International, Inc.'s Answer and Counterclaims to Triangle Software, LLC's Complaint.
Garmin International, Inc.'s Amended Answer and Counterclaims to Triangle Software, LLC's Complaint.
Garmin International, Inc. and Garmin USA, Inc.'s Answer and Counterclaim to Triangle Software, LLC's Supplemental Complaints filed Jun. 17, 2011 in *Triangle Software, LLC* v. *Garmin International Inc. et al.*, in the United States District Court for the Eastern District of Virginia, Alexandria Division, Case No. 1:10-cv-1457-CMH-TCB, 36 pages.
Garmin's Preliminary Invalidity Contentions and Certificate of Service filed May 16, 2011 in *Triangle Software, LLC. V. Garmin International, Inc. et al.*, Case No. 1: 10-cv-1457-CMH-TCB in the United States District Court for the Eastern District of Virginia, Alexandria Division, 46 pages.
Goldberg et al., "Computing the Shortest Path: A* Search Meets Graph Theory," Proc. of the 16th Annual ACM-SIAM Sym. on Discrete Algorithms, Jan. 23-25, 2005. Vancouver, BC.
Goldberg et al., "Computing the Shortest Path: A* Search Meets Graph Theory," Microsoft Research, Technical Report MSR-TR-2004 Mar. 24, 2003.
Golisch, F., Navigation and Telematics in Japan, International Symposium on Car Navigation Systems, May 21, 1997, 20 pages, held in Barcelona, Spain.
GM Exhibits Prototype of TravTek Test Vehicle, Inside IVHS, Oct. 28, 1991, V. 1, No. 21, 2 pages.
Gueziec, Andre, "3D Traffic Visualization in Real Time," ACM Siggraph Technical Sketches, Conference Abstracts and Applications, p. 144, Los Angeles, CA, Aug. 2001.
Gueziec, A., "Architecture of a System for Producing Animated Traffic Reports," Mar. 30, 2011, 42 pages.
Handley, S. et al., "Learning to Predict the Duration of an Automobile Trip," Proceedings of the Fourth International Conference on Knowledge Discovery and Data Mining, 1998, 5 pages, AAAI Press, New York, NY, USA.
Hankey, et al., "In-Vehicle Information Systems Behavioral Model and Design Support: Final Report," Feb. 16, 2000, Publication No. 00-135, Research, Development, and Technology, Turner-Fairbank Highway Research Center, McLean, Virginia.
Hirata et al., "The Development of a New Multi-AV System Incorporating an On-Board Navigation Function," International Congress and Exposition, Mar. 1-5, 1993, pp. 1-12, held in Detroit, MI, SAE International, Warrendale, PA, USA.
Hoffmann, G. et al., Travel Times as a Basic Part of the LISB Guidance Strategy, Third International Conference on Road Traffic Control, May 1-3, 1990, pp. 6-10, London, U.K.
Hoffmann, T., "2005 Acura RL Prototype Preview," Auto123.com, 4 pages.
Hu, Z. et al., "Real-time Data Fusion on Tracking Camera Pose for Direct Visual Guidance," IEEE Vehicles Symposium, Jun. 14-17, 2004, pp. 842-847, held in Parma, Italy.
Hulse, M.C. et al., "Development of Human Factors Guidelines for Advanced Traveler Information Systems and Commercial Vehicle Operations: Identification of the Strengths and Weaknesses of Alternative Information Display Formats," Publication No. FHWA-RD-96-142, Oct. 16, 1998, 187 pages, Office of Safety and Traffic Operation R&D, Federal Highway Administration, USA.

(56) References Cited

OTHER PUBLICATIONS

Initial Expert Report of Roy Summer dated Jun. 16, 2011 in *Triangle Software, LLC* v. *Garmin International Inc. et al.*, in the United States District Court for the Eastern District of Virginia, Alexandria Division, Case No. 1:10-cv-1457-CMH-TCB, 289 pages.
Initial Expert Report of William R. Michalson, Ph.D. dated Jun. 17, 2011 in *Triangle Software, LLC* v. *Garmin International Inc. et al.*, in the United States District Court for the Eastern District of Virginia, Alexandria Division, Case No. 1:10-cv-1457-CMH-TCB, 198 pages.
Inman, V.W., et al., "TravTek Global Evaluation and Executive Summary," Publication No. FHWA-RD-96-031, Mar. 1996, 104 pages, U.S. Department of Transportation, McLean, VA, USA.
Inman, V.W., et al., "TravTek Evaluation Rental and Local User Study," Publication No. FHWA-RD-96-028, Mar. 1996, 110 pages, U.S. Department of Transportation, McLean, VA, USA.
Jiang, G., "Travel-Time Prediction for Urban Arterial Road: A Case on China," Proceedings Intelligent Transportation Systems, Oct. 12-15, 2003, pp. 255-260, IEEE, New York, NY, USA.
Karabassi, A. et al., "Vehicle Route Prediction and Time and Arrival Estimation Techniques for Improved Transportation System Management," in Proceedings of the Intelligent Vehicles Symposium, 2003, pp. 511-516, IEEE, New York, NY, USA.
Koller, D. et al., "Virtual GIS: A Real-Time 3D Geographic Information System," Proceedings of the 6th IEEE Visualization Conference (Visualization 95) 1995, pp. 94-100, IEEE, New York, NY, USA.
Kopitz et al., Table of Contents, Chapter 6, Traffic Information Services, and Chapter 7, Intelligent Transport Systems and RDS-TMC in RDS: The Radio Data System, 1992, Cover p. XV, pp. 107-167, Back Cover page, Artech House Publishers, Boston, USA and London, Great Britain.
Krage, M.K., "The TravTek Driver Information System," Vehicle Navigation & Information Systems Conference Proceedings (VNIS'91), P-253, Part 1, Oct. 1991, pp. 739-748, Soc. of Automotive Engineers, Inc., Warrendale, PA, USA.
Ladner, R. et al., "3D Mapping of Interactive Synthetic Environment," Computing Practices, Mar. 2000, pp. 33-39, IEEE, New York, NY, USA.
Levinson, D., "Assessing the Benefits and Costs of Intelligent Transportation Systems: The Value of Advanced Traveler Information System," Publication UCB-ITS-PRR-99-20, California Path Program, Jul. 1999, Institute of Transportation Studies, University of California, Berkeley, CA, USA.
Lowenau, J., "Final Map Actualisation Requirements," Version 1.1, ActMAP Consortium, Sep. 30, 2004, 111 pages.
Meridian Series of GPS Receivers User Manual, Magellan, 2002, 106 pages, Thales Navigation, Inc., San Dimas, CA, USA.
Ness, M., "A Prototype Low Cost In-Vehicle Navigation System," IEEE—IEE Vehicle Navigation & Information Systems Conference (VNIS), 1993, pp. 56-59, New York, NY, USA.
N'Fit Xanavi, unknown date, 94 pages, Japana.
Nintendo Wii Operations Manual Systems Setup. 2009.
Nissan Automobile Navigation System User Manual, [date unknown], 163 pages.
Noonan, J., "Intelligent Transportation Systems Field Operational Test Cross-Cutting Study Advanced Traveler Information Systems," Sep. 1998, 27 pages, U.S. Department of Transportation, McLean, VA, USA.
Odagaki et al., Automobile Navigation System with Multi-Source Guide Information, International Congress & Exposition, Feb. 24-28, 1992, pp. 97-105. SAE International, Warrendale, PA, USA.
Panasonic Portable Navigation System User Manual for Products KX-GT30, KX-GT30X, and KX-GT30Z, Cover page, pp. 1-5, 132-147, End pages, Matsushita Denki Sangyo K.K., Fukuoka City, Japan [Date Unknown].
Preliminary Invalidity Contentions of Defendant TomTom, Inc., Certificate of Service and Exhibit A filed May 16, 2011 in *Triangle Software, LLC.* V. *Garmin International, Inc. et al.*, Case No. 1:10-cv-1457-CMH-TCB in the United States District Court for the Eastern District of Virginia, Alexandria Division, 354 pages.

Raper, J.F., "Three-Dimensional GIS," in Geographical Information Systems: Principles and Applications, 1991, vol. 1, Chapter 20, 21 pages.
"References Manual for the Magellan RoadMate 500/700." 2003, 65 pages, Thales Navigation, Inc., San Dimas, CA, USA.
Riiett, L.R., "Simulating the TravTek Route Guidance Logic Using the Integration Traffic Model," Vehicle Navigation & Information System, P-253, Part 2, Oct. 1991, pp. 775-787, Soc. of Automotive Engineers, Inc., Warrendale, PA, USA.
Rillings, J.H., "Advanced Driver Information Systems," IEEE Transactions on Vehicular Technology, Feb. 1991, vol. 40, No. 1, pp. 31-40, IEEE, New York, NY, USA.
Rillings, J.H., "TravTek," Vehicle Navigation & Information System Conference Proceedings (VNIS'91), P-253, Part 2, Oct. 1991, pp. 729-737, Soc. of Automotive Engineers, Inc., Warrendale, PA, USA.
Rockwell, Mark, "Telematics Speed Zone Ahead," Wireless Week, Jun. 15, 2004, Reed Business Information, http://www.wirelessweek.com.
Rupert, R.L., "The TravTek Traffic Management Center and Traffic Information Network," Vehicle Navigation & Information System Conference Proceedings (VNIS'91), P-253, Part 1, Oct. 1991, pp. 757-761, Soc. of Automotive Engineers, Inc., Warrendale, PA, USA.
Schofer, J.L., "Behavioral Issues in the Design and Evaluation of Advanced Traveler Information Systems," Transportation Research Part C 1, 1993, pp. 107-117, Pergamon Press Ltd., Elsevier Science Ltd.
Schulz, W., "Traffic Management Improvement by Integrating Modem Communication Systems," IEEE Communications Magazine, Oct. 1996, pp. 56-60, New York, NY, USA.
Shepard, I.D.H., "Information Integration and GIS," in Geographical Information Systems: Principles and Applications, 1991, vol. 1, pp. Cover page, 337-360, end page.
Sirius Satellite Radio: Traffic Development Kit Start Up Guide, Sep. 27, 2005, Version 00.00.01, NY, New York, 14 pages.
Slothhower, D., "Sketches & Applications," SIGGRAPH 2001, pp. 138-144, Stanford University.
Sumner, R., "Data Fusion in Pathfinder and TravTek," Part 1, Vehicle Navigation & Information Systems Conference Proceedings (VNIS'91), Oct. 1991, Cover & Title page, pp. 71-75.
Supplemental Expert Report of William R. Michalson, PH.D. Regarding Invalidity of the Patents-in-Suit dated Jul. 5, 2011 in *Triangle Software, LLC* v. *Garmin International Inc. et al.*, in the United States District Court for the Eastern District of Virginia, Alexandria Division, Case No. 1:10-cv-1457-CMH-TCB, 23 pages.
Tamuara et al., "Toward Realization of VICS—Vehicle Information and Communications System," IEEE—IEE Vehicle Navigation & Information Systems Conference (VNIS'93), 1993, pp. 72-77, held in Ottawa, Canada.
Taylor, K.B., "TravTek—Information and Services Center," Vehicle Navigation & Information System Conference Proceedings (VNIS'91), P-253, Part 2, Oct. 1991, pp. 763-774, Soc. of Automotive Engineers, Inc., Warrendale, PA, USA.
Texas Transportation Institute, "2002 Urban Mobility Study: 220 Mobility Issues and Measures: The Effects of Incidents—Crashes and Vehicle Breakdowns" (2002).
"The Challenge of VICS: The Dialog Between the Car and Road has Begun," Oct. 1, 1996, pp. 19-63, The Road Traffic Information Communication System Centre (VICS Centre), Tokyo, Japan.
Thompson, S.M., "Exploiting Telecommunications to Delivery Real Time Transport Information," Road Transport Information and Control, Conf. Publication No. 454, Apr. 21-23, 1998, pp. 59-63, IEE, U.K.
Tonjes, R., "3D Reconstruction of Objects from Ariel Images Using a GIS," presented at ISPRS Workshops on "Theoretical and Practical Aspects of Surface Reconstructions and 3-D Object Extraction" Sep. 9-11, 1997, 8 pages, held in Haifa, Israel.
"TravTek Information and Services Center Policy/Procedures Manual," Feb. 1992, 133 pages, U.S. Department of Transportation, McLean, VA, USA.
Truett, R., "Car Navigation System May Live on After Test," The Orlando Sentinel, Feb. 17, 1993, p. 3 pages.

(56) References Cited

OTHER PUBLICATIONS

U.S. Dept. of Transportation, Closing the Data Gap: Guidelines for Quality Advanced Traveler Information System (ATIS) Data, Version 1.0, Sep. 2000, 41 pages.
User Guide of Tom Tom One; 2006.
Vollmer, R., "Navigation Systems—Intelligent Co-Drivers with Knowledge of Road and Tourist Information," Navigation and Intelligent Transportation Systems, Automotive Electronics Series, Society of Automotive Engineers, 1998, pp. Cover page, Table of Contents, pp. 9-17.
Volkswagen Group of America, Inc.'s Answer and Counterclaim.
Watanabe, M. et al., "Development and Evaluation of a Car Navigation System Providing a Bird's-Eye View Map Display," Technical Paper No. 961007, Feb. 1, 1996, pp. 11-18, SAE International.
Wischhof, L. et al., "SOTIS—A Self-Organizing Traffic Information System," Proceedings of the 57th IEEE Vehicular Technology Conference (VTC—03), 2003, pp. 2442-2446, New York, NY, USA.
WSI, "TrueView Interactive Training Manual, Showfx Student Guide," Print Date: Sep. 2004, Document Version: 4.3x. Link: http://apollo.lsc.vsc.edu/intranet/WSI_Showfx/training/970-TVSK-SG-43.pdf.
XM Radio Introduces Satellite Update Service for Vehicle Navigation, Apr. 8, 2004, 2 pages.
Yim et al., TravInfo. Field Operational Test Evaluation "Evaluation of TravInfo Field Operation Test" Apr. 25, 2000.
Yim et al., "TravInfo Field Operational Test Evaluation: Information Service Providers Customer Survey" (2000).
Yokouchi, K., "Car-Navigation Systems," Mitsubishi Electr. Adv. Technical Reports, 2000, vol. 91, pp. 10-14, Japan.
You, J. et al., "Development and Evaluation of a Hybrid Travel Time Forecasting Model," Transportation Research Parc C 9, 2000, pp. 231-256, Pergamon Press Ltd., Elsevier Science Ltd., U.K.
Zhao, Y., "Vehicle Location and Navigation Systems," 1997, 370 pages, Arthech House, Inc., Norwood, MA, USA.
Zhu, C. et al. "3D Terrain Visualization for Web GIS," Center for Advance Media Technology, Nanyang Technological University, Singapore, 2003, 8 pages.
PCT Application No. PCT/US2004/23884, Search Report and Written Opinion mailed Jun. 17, 2005.
PCT Application No. PCT/US2011/48680, Search Report and Written Opinion mailed Feb. 7, 2012.
PCT Application No. PCT/US2011/51647, Search Report and Written Opinion mailed Feb. 2, 2012.
PCT Application No. PCT/US2011/60663, Search Report and Written Opinion mailed May 31, 2012.
PCT Application No. PCT/US2012/38702, Search Report and Written Opinion mailed Aug. 24, 2012.
EP Patent Application No. 11 825 897.9, Communication mailed May 3, 2013.
U.S. Appl. No. 10/379,967, Final Office Action mailed May 11, 2005.
U.S. Appl. No. 10/379,967, Office Action mailed Sep. 20, 2004.
U.S. Appl. No. 10/897,550, Office Action mailed Jun. 12, 2009.
U.S. Appl. No. 10/897,550, Office Action mailed Jan. 21, 2009.
U.S. Appl. No. 10/897,550, Office Action mailed Aug. 1, 2008.
U.S. Appl. No. 10/897,550, Office Action mailed Oct. 3, 2007.
U.S. Appl. No. 11/509,954, Office Action mailed Nov. 23, 2007.
U.S. Appl. No. 11/751,628, Office Action mailed Jan. 29, 2009.
U.S. Appl. No. 12/283,748, Office Action mailed Aug. 20, 2009.
U.S. Appl. No. 12/283,748, Office Action mailed Mar. 11, 2009.
U.S. Appl. No. 12/398,120, Final Office Action mailed Mar. 26, 2013.
U.S. Appl. No. 12/398,120, Office Action mailed Nov. 14, 2012.
U.S. Appl. No. 12/398,120, Final Office Action mailed Apr. 12, 2012.
U.S. Appl. No. 12/398,120, Office Action mailed Nov. 15, 2011.
U.S. Appl. No. 12/763,199, Final Office Action mailed Nov. 1, 2010.
U.S. Appl. No. 12/763,199, Office Action mailed Aug. 5, 2010.
U.S. Appl. No. 12/860,700, Office Action mailed Feb. 26, 2013.
U.S. Appl. No. 12/881,690, Office Action mailed Apr. 22, 2013.
U.S. Appl. No. 12/967,045, Final Office Action mailed Jun. 27, 2012.
U.S. Appl. No. 12/967,045, Office Action mailed Jul. 18, 2011.
U.S. Appl. No. 13/316,250, Office Action mailed Jan. 18, 2013.
U.S. Appl. No. 13/475,502, Office Action mailed Apr. 22, 2013.
U.S. Appl. No. 13/561,269, Office Action mailed Dec. 13, 2012.
U.S. Appl. No. 13/561,327, Office Action mailed Oct. 26, 2012.
Acura Debuts AcuraLink™ Satellite-Linked Communication System with Industry's First Standard Real Time Traffic Feature at New York International Auto Show, 2004, 4 pages.
Adib Kanafani, "Towards a Technology Assessment of Highway Navigation and Route Guidance," Program on Advanced Technology for the Highway, Institute of Transportation Studies, University of California, Berkeley, Dec. 1987, PATH Working Paper UCB-ITS-PWP-87-6.
Answer, Affirmative Defenses, and Counterclaims by Defendant Westwood One, Inc., to Plaintiff Triangle Software, LLC's Complaint for Patent Infringement.
Answer and Counterclaims of TomTom, Inc. to Plaintiff Triangle Software, LLC's Complaint for Patent Infringement.
Amended Answer and Counterclaims of TomTom, Inc. to Plaintiff Triangle Software, LLC's Complaint for Patent Infringement.
Attachment A of Garmin's Preliminary Invalidity Contentions and Certificate of Service filed May 16, 2011 in *Triangle Software, LLC. V. Garmin International, Inc. et al.*, Case No. 1: 10-cv-1457-CMH-TCB in the United States District Court for the Eastern District of Virginia, Alexandria Division, 6 pages.
Attachment B of Garmin's Preliminary Invalidity Contentions and Certificate of Service filed May 16, 2011 in *Triangle Software, LLC. V. Garmin International, Inc. et al.*, Case No. 1: 10-cv-1457-CMH-TCB in the United States District Court for the Eastern District of Virginia, Alexandria Division, 618 pages.
Audi-V150 Manual, Oct. 2001, 152 pages, Japan.
Balke, K.N., "Advanced Technologies for Communicating with Motorists: A Synthesis of Human Factors and Traffic Management Issues," Report No. FHWA/TX-92/1232-8, May 1992, Texas Department Transportation, Austin, TX, USA, 62 pages.
Barnaby J. Feder, "Talking Deals; Big Partners in Technology," Technology, The New York Times, Sep. 3, 1987.
Birdview Navigation System by Nissan Motor Corp, 240 Landmarks of Japanese Automotive Technology, 1995, 2 pages, Society of Automotive Engineers of Japan, Inc., Japan.
U.S. Appl. No. 12/860,700, Final Office Action mailed Jun. 26, 2013.
U.S. Appl. No. 12/881,690, Final Office Action mailed Aug. 9, 2013.
U.S. Appl. No. 13/475,502, Final Office Action mailed Sep. 10, 2013.
U.S. Appl. No. 13/747,454, Office Action mailed Jun. 17, 2013.
U.S. Appl. No. 13/752,351, Office Action mailed Jul. 22, 2013.
U.S. Appl. No. 13/316,250, Final Office Action mailed Jun. 24, 2013.

* cited by examiner

200

CROWD SOURCED TRAFFIC REPORTING

CROSS-REFERENCE TO RELATED APPLICATION

This application claims the priority benefit of U.S. provisional application No. 61/413,473 filed on Nov. 14, 2010 and entitled "Traffic Reporting" and U.S. provisional application No. 61/487,425 filed May 18, 2011 and entitled "Developing and Supporting High Usage Traffic Information Mobile Apps." The disclosure of the aforementioned applications is incorporated herein by reference.

BACKGROUND OF THE INVENTION

1. Field of the Invention

The present invention generally concerns traffic reporting. More particularly, the present invention relates to the use of crowd sourced data and other sources of traffic data to provide traffic reports, maps, and forecasts.

2. Description of the Related Art

The rapid worldwide growth in mobile phone traffic has corresponded to a rapid increase in smartphone use. Smartphones are expected to overtake the number of feature phones by the end of 2011. With a smartphone, a consumer may utilize an assortment of applications to obtain a variety of useful real-time information including traffic information.

Current traffic reporting applications rely on traditional traffic sources such as public sector and private entity sources. These applications typically do not consider crowd sourced data that can provide updated or real-time traffic data not otherwise available from traditional sources. One mobile application, called "Waze" (available from Waze Ltd.), automatically collects traffic data and road condition information from users as they drive. "Waze" relies primarily on crowd sourced data to present updated traffic information to users of the application. "Waze," however, does not consider traditional traffic sources when presenting traffic information to its users.

There is a need in the art for traffic reporting technology that leverages a variety of traffic data, including crowd sourced data, to generate more accurate and reliable traffic reports, maps, and forecasts.

SUMMARY OF THE INVENTION

Embodiments of the present invention allow for the generation of more reliable and accurate traffic reports, maps, and forecasts based on various data types and sources. Data sources include public sector sources, private entities, and end users providing crowd sourced data.

In a first claimed embodiment, a method for traffic reporting using crowd sourced data is claimed. Through this method crowd sourced data from a computing device associated with a user traversing a travel route is received. The crowd sourced data may include location data and speed data associated with the user. The crowd sourced data is then verified for timeliness. A traffic report is generated based on the crowd sourced data and is then displayed on the computing device.

In a second claimed embodiment, a system for generating a traffic report based on crowd sourced data is claimed. The system includes memory for storing crowd sourced data received from a computing device associated with a user traversing a travel route. The system also includes an application server. The application server verifies the timeliness of the crowd sourced data, generates a traffic report based on the crowd sourced data, and displays the traffic report on the computing device.

In a third claimed embodiment, a non-transitory computer-readable medium is claimed. The storage medium includes a computer program that is executable by a processor to perform a method for generating a traffic report. The method includes receiving crowd sourced data from a user traversing a travel route, the crowd sourced data including location data and speed data associated with the user, verifying timeliness of the crowd sourced data, generating a traffic report based on the crowd sourced data, and displaying the traffic report.

DETAILED DESCRIPTION

Embodiments of the present invention may provide a traffic reporting service that uses crowd sourced data to generate more accurate and complete traffic reports.

Figure 1:
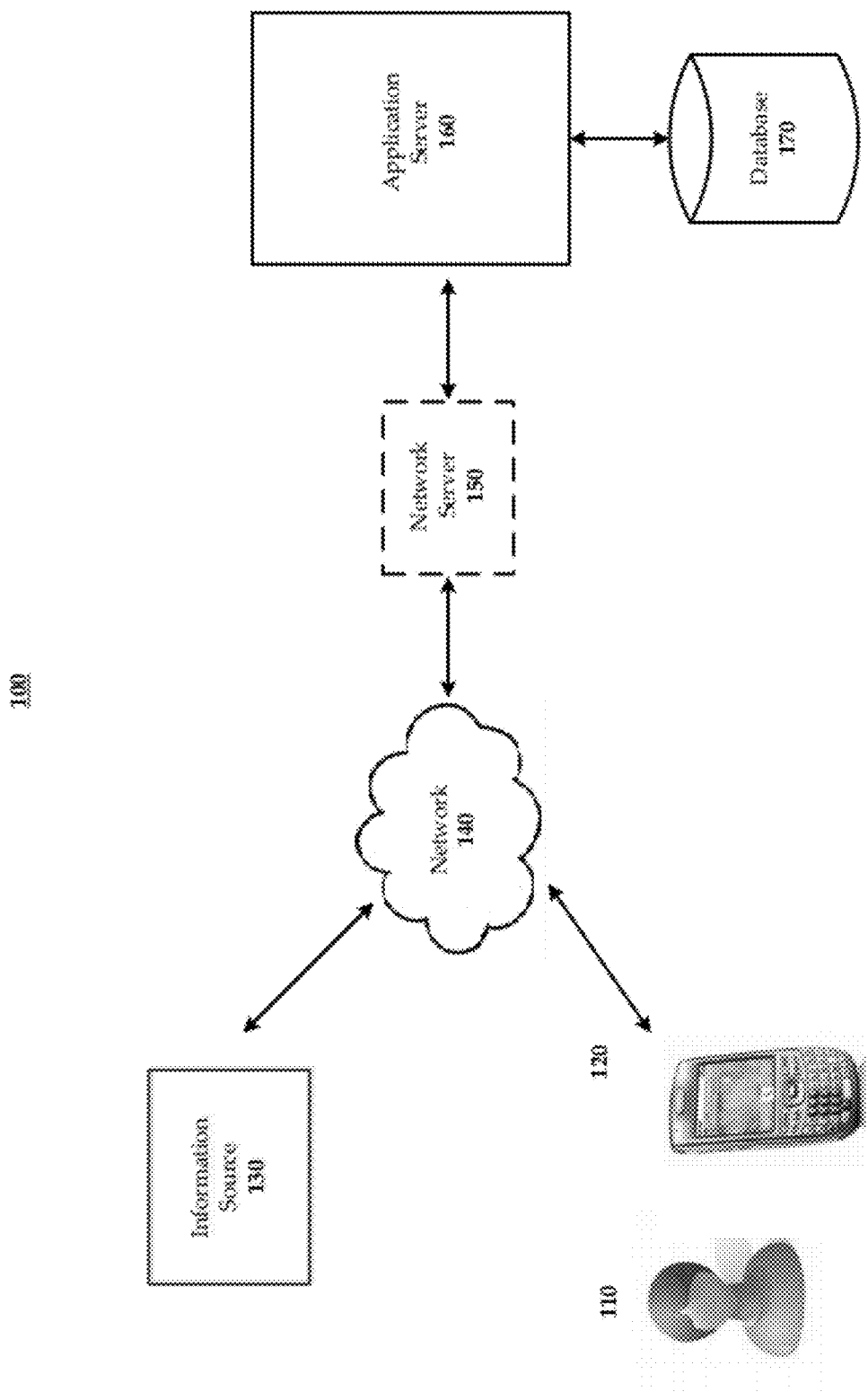
FIG. 1 illustrates a system used for generating a traffic report using crowd sourced data.

FIG. 1 illustrates a system that may be a system used for generating a traffic report using crowd sourced data. The system 100 of FIG. 1 includes user 110, computing device 120, information source 130, network 140, optional network server 150, application server 160, and database 170.

System 100 may include a number of users and computing devices that operate in conjunction with a traffic reporting service. User 110 may subscribe (e.g., create an account) or register with the traffic reporting service provided by application server 160 via computing device 120. Once user 110 has registered with the traffic reporting service, user 110 may perform a login operation (i.e., access account) and may access the traffic reporting service to receive traffic reports, forecasts, and maps, and alerts of traffic incidents and delays. User 110 may also create travel routes and obtain personalized traffic reports for the same. User 110 may also request access to and view live or historic feeds from particular traffic cameras.

When registering with the traffic reporting service, user 110 may be required to input or provide (via computing device 120) registration information or user data including but not limited to name, user ID, password address, phone number, e-mail address, birthday, age, and gender. User 110 may also provide other data (e.g., start and end points) relating to one or more traffic routes. User 110 may then receive personalized traffic reports for frequently traversed routes such as home to office, office to home, home to school, etc.

User 110 may also provide preferences such as a preference for a type of traffic information. For example, user 110 may indicate a preference to receive an alert of traffic incidents or delays that may appear on a frequently traversed route, a selected route, or current route. A user preference may also include a preference for or bookmark for a particular traffic camera or latest snapshot or video from a traffic camera.

User registration information, user preferences, and route information may be used to generate a profile of user 110 which may be used to customize traffic reports and alerts for user 110. For example, user 110 may indicate a desire to receive a traffic alert concerning a particular travel route, geographical location, or specific road or highway. User route data and profile information may be stored in database 170.

System 100 may include database 170 for storing data. Database 170 may store route information, profile information, traffic data from information sources 130, and other data for use with the traffic reporting service provided by application server 160. Database 170 may be separate from or integrated with application server 160. Database 170 may be a single database server or distributed amongst a series of servers. Database 170 may also store any updates to user data, route information, or traffic data received from/provided by user 110 or information sources 130.

The information sources 130 may be provided by various organizations (public or private entities) and in a variety of forms. The information sources 130 may include data sources related to traffic data (e.g., traffic speed, traffic flow) and as described in U.S. Pat. No. 7,221,287, which is incorporated herein by reference, or weather data such as forecasts. The information sources 130 may also include data sources related to newsworthy events or incidents such as school closings, election results, and other information that may be featured or relevant in a traffic report. The information sources 130 may require subscription or authentication for access and may be accessible via Telnet, FTP, or web services protocols. The information may be received from the information sources 130 in real-time or near real-time to allow for generation of an equally real-time or near real-time presentation. Information sources 130 may also include local memory storing previously received data or an antenna receiver in the likes of a GPS device that is actively or occasionally receiving data from a still separate source of data.

In an embodiment of the present invention utilizing traffic data specific to the San Francisco Bay area, for example, the information sources 130 may include one or more of the 511.org system (a collaboration of public agencies including the California Highway Patrol, Metropolitan Transportation Commission, and CAL TRANS), the California Highway Patrol (CHP) World Wide Web server, the PeMS system at the University of California at Berkeley, various public event listings, or a publicly or privately accessible user input mechanism. For weather data, the information sources 130 may include the National Weather Service among other weather information sources. Other data sources or alternative types of data sources (e.g., non-traffic and non-weather related sources) may be incorporated and utilized in various embodiments of the present invention.

Figure 3:
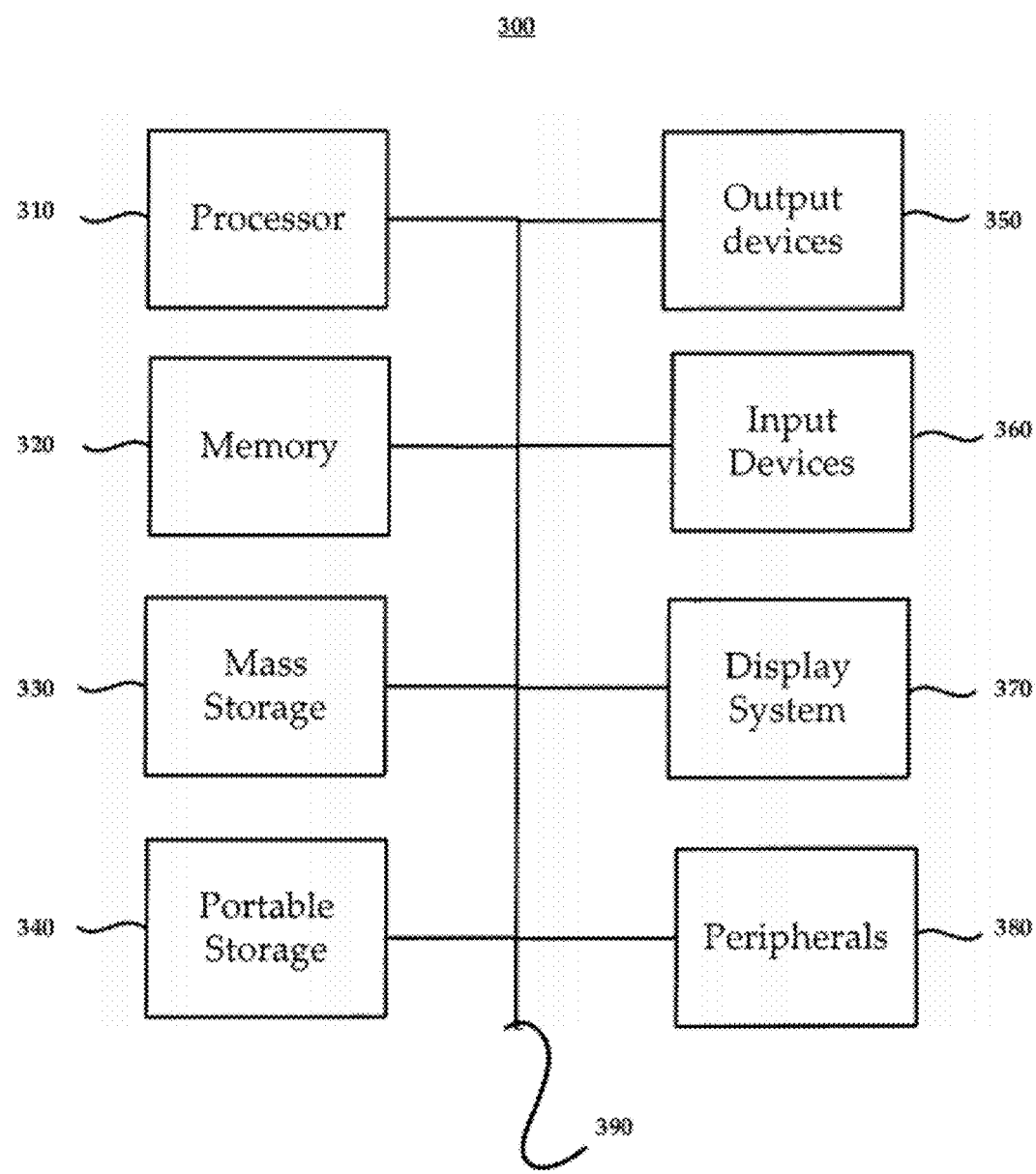
FIG. 3 illustrates a computing system that may be used to implement an embodiment of the present invention.

Computing device 120 is inclusive of a general purpose computing device capable of accessing information over a network. Computing device 120 may be any computing device known in the art such as a workstation, laptop computer, net book computer, tablet computer, mobile device, cellular telephone, or the like that can communicate over network 140. Computing device 120 may include software and/or hardware capable of sending, receiving, and processing data such as crowd sourced data, traffic data, or user profile data. Computing device 120 may receive data from user 110 and send the data over network 140 to application server 160 for processing. Computing device 120 may also offer location-based information such as that generated through cellular network base stations, IP network access, or GPS data. Computing device 120 may include certain components as illustrated in FIG. 3.

Network 140 is inclusive of any communication known in the art such as the Internet, Local Area Network (LAN), Wide Area Network (WAN), intranet, extranet, private network, or other network. Application server 160 may be accessed via optional network server 150. Network server 150 may receive and process data and/or requests from computing device 120. For example, user 110 may request and provide data to become a registered subscriber with the traffic reporting service provided by application server 160. Processing the data and/or request may include sending data to application server 160, receiving a response from application server 160, and sending a response or data to network server 150. Network server 150 may then forward the response or data to computing device 120.

Application server 160 may be implemented in a general computing device that otherwise communicates with database 170 and network server 150. An example of such a device is the general computing system illustrated in FIG. 3. One or more software applications or modules may be stored in memory and executable by a processor (not shown) at application server 160. The present traffic reporting service may be implemented by one or more processors that execute instructions stored in one or more memory mediums. The executed instructions may result in the processor(s) generating and providing one or more graphical interfaces.

Figure 2:
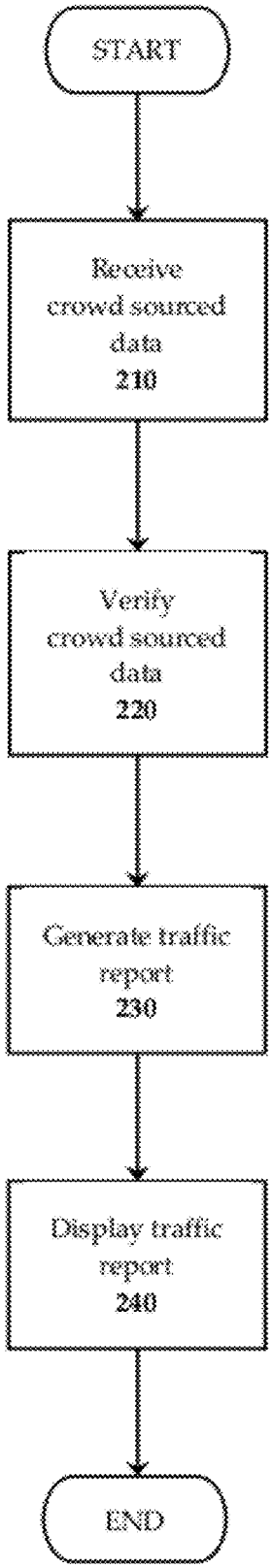
FIG. 2 illustrates a method for traffic reporting using crowd sourced data.

FIG. 2 illustrates a method for traffic reporting using crowd sourced data. The steps identified in FIG. 2 (and the order thereof) are exemplary and may include various alternatives, equivalents, or derivations thereof including but not limited to the order of execution of the same. The steps of the method of FIG. 2 (and its various alternatives) may be embodied in hardware or software including a non-transitory computer-readable storage medium (e.g., an optical disc or memory card) having instructions executable by a processor of a computing device. A user may launch or activate the method of FIG. 2 by opening or activating an application in a computing device such as a mobile device.

At step 210, crowd sourced data is received at application server 160 from a computing device associated with a user. A user may authorize the collection of crowd sourced data via a mobile based computing device 120 or one that otherwise generates location based data (e.g., GPS, base station identification, triangulation data, etc.). Computing device 120 may receive user authorization and transmit collected crowd sourced data to application server 160 for processing by way of a user 110 offering certain permissions on the device 120.

Crowd sourced data may be an indicator of traffic conditions when it includes traffic data about a non-sensored thoroughfare or roadway that is not available by another means. Crowd sourced data may include data collected by active means as well as passive means. Passive crowd sourced data may include, for example, non-personally identifiable data such as location information, geographic coordinate data (e.g., latitude/longitude), timestamp data, heading information, and floating car data, which is sometimes referred to as floating cellular data. Location may be determined by any positioning technology known in the art such as global navigation satellite systems (e.g., GPS or GNSS), real-time locating systems, or local positioning systems. Floating car data may include speed data, direction of travel information, time information, or other information received from a computing device (e.g., mobile phone). Information may also include electronic toll collection data and number plate recognition information.

Active data may include data actively provided by a user such as incident data concerning a traffic event or delay. A user may transmit traffic information (i.e., incident report/incident data) to application server 160. An incident report/incident data may include location information, time of occurrence, end time, or highway and milepost information for any type of incident such as an accident, road hazard, road work, street or highway closure, or any other condition potentially affecting traffic. An incident may be planned (e.g., road work) or unplanned. Unplanned incidents may include crashes with or without injuries, overturned vehicles, disabled vehicles, or roadway obstructions (e.g., by pedestrians, animals, debris).

Traffic data from information sources 130 may also be received at application server 160. Traffic data from information sources may come from public agencies (e.g., U.S. Department of Transportation, local police departments) or private entities (e.g., Inrix, TrafficCast, Clear Channel). Traffic data may include incident data, speed information, flow information, or information from traffic cameras or videos. Speed and flow information may be obtained from various kinds of detector equipment along highways or roadways such as loop detectors and other magnetic sensors, radar detectors, toll tag readers, Bluetooth traffic monitoring devices, or video vehicle detectors. Data from traffic cameras and video cameras may be obtained from roadside cameras, in-vehicle cameras, or the like, and may capture live videos, snapshots, and images of actual driving conditions. In addition to providing a glimpse of real-time traffic conditions, these cameras may also show the effects of weather on traffic.

At step 220, the received crowd sourced data is verified for timeliness to optimize latency and ensure the relevance of the data. To obtain the most accurate and complete depiction of actual traffic conditions, the most recent, up-to-date crowd sourced data is desired. For example, crowd sourced data that is 4 hours old may no longer affect traffic and be irrelevant. Application server 160 may process the crowd sourced data and share the crowd sourced data with other users in the network. The received crowd sourced data may include location information and speed information. Location data may be collected from computing device 120 and application server 160 may determine a sampling interval $t_s$ and a transmission interval $t_t$ associated with each piece of crowd source data. $t_s$ is the time between samples while $t_t$ is the time between transmission of the samples. The sampling and transmission intervals $t_s$ and $t_t$ may be set ahead of time, or may vary based on the time of day, the observed speed of the computing device 120 over a recent time interval, or the available battery life of the computing device 120 to avoid inadvertently over utilizing low battery power. Alternately, the application server 160 may send instructions to the computing device 120 to alter $t_s$ and $t_t$ depending upon various needs. Adjusting $t_s$ and $t_t$ allows a trade-off between the quality of the resulting data (frequency, timeliness) and the resources expanded in terms of battery usage to collect more frequent samples on the computing device 120, and the transmission costs involved in transmitting information at more frequent intervals.

The horizontal accuracy of the position information may also be transmitted together with the location coordinates. If the horizontal accuracy is not readily available, it may be substituted with a default value. The position and its accuracy may then be compared with proximate road segments to determine which road segment the computing device 120 is most likely to be traveling on. If the heading or the most recent position information is available, the direction of travel may be compared with the direction of road segments. Recent positions of the computing device 120 are likely to be situated on the same or adjoining road segments, and presumably in the same direction of travel. Such reasonable tests may be used to determine if particular positions represent erroneous data and need to be filtered out.

Compared to other sourced of data (e.g., traffic data from public and/or private entities), crowd sourced data (e.g., GPS location and speed data) may have the lowest latency since the maximum latency is bounded by $t_t$-$t_s$ and there are no intermediaries between the computing device 120 and application server 160.

At step 230, application sever 160 generates a traffic report based on the crowd sourced data. In one embodiment application server 160 generates the traffic report based on traffic data received from information sources 130 in addition to crowd source data. The traffic data from the information sources 130 may include real-time speed data, flow information, forecasted or historical data, or other pertinent traffic information for a travel route specified by user 110, such as a frequently traveled route or current route. Besides traffic data and crowd sourced data, a generated traffic report may also be based on other relevant information such as weather information or forecasts, or newsworthy events such as concerts, sporting events, street closures, or protests.

A generated traffic report may include point-to-point trip times, trip time predictions for a travel route, and recommended departure times for various times and days of the week. Application server 160 may calculate point-to-point trip times based on starting and end points provided by user 110. When calculating point-to-point trip times, a starting point may be the real-time location of computing device 120. Application server 160 may also calculate or predict trip times for a particular travel route based on crowd sourced data, traffic data from information sources 130, or combinations of the same.

Based on traffic information received from various sources (e.g., crowd sourced data and/or traffic data) application server 160 may further calculate and recommend a departure time for timely traversing a route when user 110 has indicated a desired arrival time. Application server 160 may also calculate and recommend departure times for different days or times of the week based on historical or forecasted traffic information received from information sources 130.

At step 240, application server 160 displays the traffic report on computing device 120. A generated traffic report that is displayed at step 240 may convey a variety of traffic information in different forms or formats. A traffic report may be textual or graphical or include combinations of the same. A traffic report, for example, may be generated and displayed in the form of a map of particular area and may include textual and/or graphical information about traffic conditions, incidents, or hazards along a travel route. A traffic report may also be generated and displayed in a textual/list format showing, for example, frequently traveled routes, the predicted travel time or recommended departure time for each route, and any notable traffic conditions or incidents affecting the route. Travel times or departure times for a particular route may be also be displayed in graphical form with time of day on the x-axis plotted against travel time in minutes on the y-axis. User 110 may use the various information presented in the traffic report to make an informed decision about which travel route to take and/or the best departure time to reach a destination. The report may be three-dimensional, include areas for advertising, or be subject to multiple points of view that can be rotated through touch screen controls or multi-finger touch/pinch control.

Application server 160 may also generate a traffic alert. Where user 110 has indicated a preference to receive a traffic alert for a particular travel route or geographical location, application server may generate a traffic alert based on received crowd sourced data and/or traffic data received from information sources 130. Application server 160 may transmit a traffic alert (e.g., via Short message service (SMS) message, e-mail message, or the like) to computing device 120.

FIG. 3 illustrates a computing system 300 that may be used to implement the present technology. System 300 of FIG. 3 may be used to implement computing device 120, network server 150, application server 160, and database 170 in the context of the system of FIG. 1. The computing system 300 of FIG. 3 includes one or more processors 310 and memory 320. Main memory 320 stores, in part, instructions and data for execution by processor 310. Main memory 320 can store the executable code when in operation. Main memory 320 may also include a database such as database 170 illustrated in FIG. 1. The system 300 of FIG. 3 further includes a mass storage device 330, portable storage medium drive(s) 340, output devices 350, user input devices 360, a graphics display 370, and peripheral devices 380.

The components shown in FIG. 3 are depicted as being connected via a single bus 390. The components, however, may be connected through one or more data transport means. For example, processor unit 310 and main memory 320 may be connected via a local microprocessor bus, and the mass storage device 330, peripheral device(s) 380, portable storage device 340, and display system 370 may be connected via one or more input/output (I/O) buses.

Mass storage device 330, which may be implemented with a magnetic disk drive or an optical disk drive, is a non-volatile storage device for storing data and instructions for use by processor unit 310. Mass storage device 330 may store the system software for implementing embodiments of the present invention for purposes of loading software into main memory 320.

Portable storage device 340 operates in conjunction with a portable nonvolatile storage medium, such as a floppy disk, compact disk or Digital video disc, to input and output data and code to and from the computer system 300 of FIG. 3. The system software for implementing embodiments of the present invention may be stored on such a portable medium and input to the computer system 300 via the portable storage device 340.

Input devices 360 provide a portion of a user interface. Input devices 360 may include an alpha-numeric keypad, such as a keyboard, for inputting alpha-numeric and other information, or a pointing device, such as a mouse, a trackball, stylus, or cursor direction keys. Additionally, the system 300 as shown in FIG. 3 includes output devices 350. Examples of suitable output devices include speakers, printers, network interfaces, and monitors.

Display system 370 may include a liquid crystal display (LCD) or other suitable display device. Display system 370 may receive textual and graphical information, and process the information for output to the display device.

Peripherals 380 may include any type of computer support device to add additional functionality to the computer system. For example, peripheral device(s) 380 may include a modem or a router.

The components contained in the computing system 300 of FIG. 3 are those typically found in computer systems that may be suitable for use with embodiments of the present invention and are intended to represent a broad category of such computer components that are well known in the art. Thus, the computing system 300 of FIG. 3 may be a personal computer, hand held computing device, telephone, mobile computing device, workstation, server, minicomputer, mainframe computer, or any other computing device. The computer may also include different bus configurations, networked platforms, multi-processor platforms, etc. Various operating systems may be used including Unix, Linux, Windows Mobile, iOS, or Android. The steps of the method of FIG. 2 (and its various alternatives) may be performed by a module or engine stored on a computer readable storage medium (e.g., optical disc, memory card, etc.) comprising instructions executable by a processor of a computing device.

The above description is illustrative and not restrictive. Many variations of the invention will become apparent to those of skill in the art upon review of this disclosure. While the present invention has been described in connection with a variety of embodiments, these descriptions are not intended to limit the scope of the invention to the particular forms set forth herein. To the contrary, the present descriptions are intended to cover alternatives, modifications, and equivalents as may be included within the spirit and scope of the invention as defined by the appended claims and otherwise appreciated by one of ordinary skill in the art.

What is claimed is:

1. A method for generating a traffic report, comprising:
   receiving, at a network interface, crowd sourced data from a computing device associated with a user traversing a travel route, wherein the crowd sourced data includes:
   passive data collected about one or more other users traversing the travel route, wherein the passive data includes location, heading, and speed data each respectively associated with the one or more other users, and
   active data provided by the one or more other users that is associated with a planned or unplanned traffic incident, wherein the active data includes a location of the incident and a time associated with the incident; and
   executing instructions stored in memory, using the processor to:
   verify timeliness of the crowd sourced data,
   generate a traffic report based on the crowd sourced data, wherein the traffic report includes an incident report, the incident report generated by processing of the active data, and
   display the traffic report on the computing device.

2. The method of claim 1, further comprising receiving traffic data from an information source, the traffic data including real-time speed data for the travel route, wherein the execution of instructions by the processor further generates the traffic report based on the traffic data received from the information source.

3. The method of claim 1, wherein the traffic report includes a trip time prediction for traversing the travel route.

4. The method of claim 1, wherein the traffic report includes a recommended departure time for traversing the travel route.

5. The method of claim 1, wherein the passive data further includes floating car data.

6. The method of claim 1, wherein the crowd sourced data further includes a timestamp.

7. The method of claim 1, wherein the information source is a public sector source.

8. The method of claim 1, wherein the information source is a private sector source.

9. The method of claim 1, wherein generation of the traffic report is further based on weather data.

10. The method of claim 1, further comprising receiving authorization from a user to transmit crowd sourced data from the computing device.

11. The method of claim 1, wherein the execution of instructions using the processor further generates a traffic alert concerning the travel route and transmits the traffic alert to the computing device.

12. A system for traffic reporting, comprising:
   memory that stores crowd sourced data received from a computing device associated with a user traversing a travel route, wherein the crowd sourced data includes:
   passive data collected about one or more other users traversing the travel route, wherein the passive data includes location, heading, and speed data each respectively associated with the one or more other users, and active data provided by the one or more other users that is associated with a planned or unplanned traffic incident, wherein the active data includes a location of the incident and a time associated with the incident; and an application server including one or more processors that:

verify timeliness of the crowd sourced data, generate a traffic report based on the crowd sourced data, wherein the traffic report includes an incident report, the incident report generated by the one or more processors based on the active data, and display the traffic report on the computing device.

13. The system of claim 12, wherein the memory further stores traffic data from an information source, the traffic data including real-time speed data for the travel route.

14. A non-transitory computer-readable storage medium having embodied there on a program, the program being executable by a processor of a computing device to perform a method for generating a traffic report, the method comprising:

receiving, at a network interface, crowd sourced data from a user traversing a travel route, wherein the crowd sourced data includes:

passive data collected about one or more other users traversing the travel route, wherein the passive data includes location, heading, and speed data each respectively associated with the one or more other users, and active data provided by the one or more other users that is associated with a planned or unplanned traffic incident, wherein the active data includes a location of the incident and a time associated with the incident;

verifying, using the processor, timeliness of the crowd sourced data;

generating, using the processor, a traffic report based on the crowd sourced data, wherein the traffic report comprises an incident report, the incident report generated based on the active data; and displaying, using the processor, the traffic report on the computing device.

* * * * *